United States Patent
Chen et al.

(10) Patent No.: US 7,962,473 B2
(45) Date of Patent: Jun. 14, 2011

(54) METHODS AND APPARATUS FOR PERFORMING STRUCTURAL JOINS FOR ANSWERING CONTAINMENT QUERIES

(75) Inventors: Shyh-Kwei Chen, Chappaqua, NY (US); Kun-Lung Wu, Yorktown Heights, NY (US); Philip Shi-Lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 509 days.

(21) Appl. No.: 11/966,537

(22) Filed: Dec. 28, 2007

(65) Prior Publication Data

US 2008/0104038 A1 May 1, 2008

Related U.S. Application Data

(63) Continuation of application No. 10/982,583, filed on Nov. 5, 2004, now Pat. No. 7,346,625.

(51) Int. Cl.
*G06F 17/30* (2006.01)

(52) U.S. Cl. ............................ 707/714; 707/741; 715/200

(58) Field of Classification Search .................. 707/102, 707/2, 713, 714, 741; 715/200
See application file for complete search history.

(56) References Cited

U.S. PATENT DOCUMENTS

| | | | | |
|---|---|---|---|---|
| 5,761,652 A | * | 6/1998 | Wu et al. | 707/2 |
| 5,781,906 A | * | 7/1998 | Aggarwal et al. | 707/102 |
| 5,806,065 A | * | 9/1998 | Lomet | 707/8 |
| 5,875,445 A | * | 2/1999 | Antonshenkov | 707/2 |
| 5,987,468 A | * | 11/1999 | Singh et al. | 707/100 |
| 6,289,334 B1 | | 9/2001 | Reiner et al. | |
| 6,289,906 B1 | * | 9/2001 | Vanden Dries et al. | 134/117 |
| 6,711,563 B1 | * | 3/2004 | Koskas | 707/3 |
| 7,010,522 B1 | * | 3/2006 | Jagadish et al. | 707/3 |
| 7,016,904 B1 | * | 3/2006 | Grove et al. | 707/100 |
| 7,219,091 B1 | * | 5/2007 | Bruno et al. | 707/3 |
| 2003/0154189 A1 | * | 8/2003 | Egilsson et al. | 707/1 |
| 2004/0064441 A1 | * | 4/2004 | Tow | 707/2 |
| 2005/0071322 A1 | * | 3/2005 | Chen et al. | 707/3 |
| 2006/0184551 A1 | * | 8/2006 | Tarachandani et al. | 707/100 |

OTHER PUBLICATIONS

Wei Wang et al., PBiTree: Coding and Efficient Processing of Containment Joins, Mar. 2003, Proceedings of IEEE ICDE, pp. 1-12.*

(Continued)

*Primary Examiner* — John R. Cottingham
*Assistant Examiner* — Sherief Badawi
(74) *Attorney, Agent, or Firm* — William Stock; Ryan, Mason & Lewis, LLP (57) ABSTRACT

Techniques are provided for performing structural joins for answering containment queries. Such inventive techniques may be used to perform efficient structural joins of two interval lists which are neither sorted nor pre-indexed. For example, in an illustrative aspect of the invention, a technique for performing structural joins of two element sets of a tree-structured document, wherein one of the two element sets is an ancestor element set and the other of the two element sets is a descendant element set, and further wherein each element is represented as an interval representing a start position and an end position of the element in the document, comprises the following steps/operations. An index is dynamically built for the ancestor element set. Then, one or more structural joins are performed by searching the index with the interval start position of each element in the descendant element set.

16 Claims, 8 Drawing Sheets

OTHER PUBLICATIONS

K.-L. Wu and P.S. Yu, "Efficient query monitoring using adaptive multiple key hashing", Nov. 2002, In Proc. of ACM Int. Conf. on Information and Knowledge Management, pp. 447-484.*

U.S. Appl. No. 10/982,570, filed Nov. 5, 2004, S-K. Chen et al.

A. Guttman, "R-trees: A Dynamic Index Structure for Spatial Searching," Proceedings of the ACM SIGMOD, 1984.

E. Hanson, et al., "Selection Predicate Indexing for Active Databases Using Interval Skip Lists," Information Systems, 21(3):269-298, 1996.

E. Hanson, et al., "A Predicate Matching Algorithm for Database Rule Systems," Proceedings of ACM SIGMOD, 1990.

E.N. Hanson et al., "The Interval Skip List: A Data Structure for Finding All Intervals that Overlap a Point," Technical Report TR92-016, Computer and Information Sciences Department, Florida, pp. 1-16, Jun. 1992.

C. Zhang et al., "On Supporting Containment Queries in Relational Database Management Systems," Proceedings of ACM SIGMOD 2001.

D. Srivastava et al., "Structural Joints: A Primitive for Efficient XML Query Pattern Matching," Proceedings of IEEE International Conference on Data Engineering, 2002.

S.-Y. Chien et al., "Efficient Structural Joins on Indexed XML Documents," Proceedings of VLDB, 2002.

H. Jiang et al., "XR-tree: Indexing XML Data for Efficient Structural Joins" Proceedings of IEEE International Conference on Data Engineering, 2003.

W. Wang et al., "PBiTree: Coding and Efficient Processing of Containment Joins," Proceedings of IEEE ICDE, 2003.

U.S. Appl. No. 10/673,651, filed Sep. 23, 2003, S-K. Chen et al.

C.P. Kolovoson et al., "Segment Indexes: Dynamic Indexing Techniques for Multi-Dimensional Interval Data," Procedures of ACM SIGMOD International Conference on Management of Data, Apr. 1991, pp. 139-147, vol. 20, No. 2.

S. Madden et al., "Continuously Adaptive Continuous Queries Over Streams," Procedures of ACM SIGMOD International Conference on Management of Data, Jun. 2002, pp. 49-60.

* cited by examiner

METHODS AND APPARATUS FOR PERFORMING STRUCTURAL JOINS FOR ANSWERING CONTAINMENT QUERIES

CROSS REFERENCE TO RELATED APPLICATION(S)

The present application is a continuation of U.S. patent application Ser. No. 10/982,583, filed on Nov. 5, 2004, the disclosure of which is incorporated by reference herein. That application is related to U.S. patent application Ser. No. 10/982,570 entitled "Methods and Apparatus for Interval Query Indexing," filed concurrently therewith.

This invention was made with Government support under Contract Number H98230-04-3-0001 awarded by the U.S. Department of Defense. The U.S. Government has certain rights to this invention as provided for by the terms of the Contract.

FIELD OF THE INVENTION

The present invention generally relates to the processing of queries and, more particularly, to techniques for performing structural joins for answering containment queries.

BACKGROUND OF INVENTION

Structure searches or containment searches, as well as value searches, are typically required in tree-structured document query processing, such as in Extensible Markup Language (XML) query processing. Searching structural or containment relationships, specifically parent-child or ancestor-descendant relationships, within a tree-structured XML document, is critical to answering many general queries against the document.

For example, in an XML document containing one and more phone call records, a containment query such as "//phone-call//Asian-News" is intended to find all the phone call records discussing "Asian News." However, finding out all the containment relationships that exist in a tree-structured document is very time consuming. A straightforward solution would require the traversal of the entire document tree. Clearly, it is not always practical to traverse a large tree-structured document. Hence, it is very important to have an efficient method for processing containment queries. Structural joins, or containment joins, are "set-at-a-time" operations that find all occurrences of the ancestor-descendant relationship between two different element sets in a tree-structured document.

In order for structural joins to work, each element in the tree-structured document is assumed to be labeled with a pair of numbers (start, end). These two numbers can represent the start and end position of the element in the document, see, e.g., C. Zhang et al., "On Supporting Containment Queries in Relational Database Management Systems," Proceedings of ACM SIGMOD 2001. However, in general, they need not be the absolute positions. They can be the relative positions so long as the interval represents the region of an element occurrence in the document. Hence, the (start, end) intervals are also called region-encoded intervals. Inverted lists can be built on all the elements, with each list containing all the region-encoded intervals of an element in the document. The region-encoded interval labeling of elements and the creation of inverted lists need only be done once for each tree-structured document.

It is known that changes or updates may occur to a tree-structured document. When updates occur, element re-labeling might be needed because the positions of elements may change as a result. However, the invention does not focus on element re-labeling. Rather, the invention focuses on techniques for performing structural joins between two element sets. Each element in the set is represented as an interval.

The structural relationship between two element nodes can be determined by the region-encoded intervals, where each element is assigned with a pair of numbers (start, end) based on its position in the XML document tree. With such a region-encoding scheme, the following holds: For any two distinct elements u and v, (1) the region of u is either completely before or after v, or (2) the region of u either completely contains v or is contained by the region of v. In other words, if there is any overlap between two intervals, the overlap is complete containment.

A structural join finds all occurrences of a structural relationship between two element sets in a document, where each element is represented as an interval with two numbers. More formally, given two input lists, AList of potential ancestors (or parents) and DList of potential descendants (or children), where each element in the lists is at least of the format (start, end), a structural join reports all pairs (a,d), where a∈AList and d∈DList, such that a.start<d.start<d.end<a.end. In other words, a structural join reports all pairs (a,d), where a∈AList and d∈DList, such that interval a contains interval d.

There are existing approaches for performing structural joins with two input interval lists. Among them are: (a) C. Zhang et al., "On Supporting Containment Queries in Relational Database Management Systems," Proceedings of ACM SIGMOD 2001; (b) D. Srivastava et al., "Structural Joins: A Primitive for Efficient XML Query Pattern Matching," Proceedings of IEEE International Conference on Data Engineering, 2002; (c) S.-Y. Chien et al., "Efficient Structural Joins on Indexed XML Documents," Proceedings of VLDB, 2002; and (d) H. Jiang et al., "XR-tree: Indexing XML Data for Efficient Structural Joins" Proceedings of IEEE International Conference on Data Engineering, 2003.

Most of the existing approaches assume either that both element lists are sorted or both element lists have indexes built on them. The goal is to skip unnecessary interval comparisons. In the XR-Tree approach, each input element list has an XRTree index and both element lists are sorted. The XRTree is a rather complex balanced-tree index structure. It maintains in each of its internal nodes a stab list, containing all elements stabbed by at least one key in the node. The focus is to skip elements that will not result in a joined output pair. However, the requirements of sorting the two input lists and maintaining two complex XR-Trees, one for each list, have significant drawbacks. First of all, sorting the two input lists can take a lot of time. Secondly, it is rather costly to construct two XR-Tree indexes, making it infeasible to build the indexes on-the-fly. Hence, the XR-Tree indexes must be pre-built offline. Offline index building has a clear disadvantage, i.e., because of storage constraints, not all elements in an XML database can be indexed. These drawbacks are particularly severe when the input lists are large in size.

Recently, a perfect binary tree encoding approach has also been proposed to perform structural joins without the requirement of sorted input lists or indexed input lists, see, e.g., W. Wang et al., "PBiTree: Coding and Efficient Processing of Containment Joins," Proceedings of IEEE ICDE 2003. In contrast to performing structural joins from two interval lists, the PBiTree approach first embeds an XML document data tree into a perfect binary tree and assigns proper labels from the binary tree to each of the elements in the XML document. By so doing, it transforms the problem of interval joins (or θ-joins) into equi-joins. Then, the approach relies on traditional database equi-join operations to perform the final joins. The need to use database operations, which usually involve many disk input/output (I/O) operations, can still be inefficient.

Hence, a need is recognized to perform efficient structural joins of two interval lists which are neither sorted nor pre-indexed.

SUMMARY OF THE INVENTION

The present invention provides techniques for performing structural joins for answering containment queries. Such inventive techniques may be used to perform efficient structural joins of two interval lists which are neither sorted nor pre-indexed.

For example, in an illustrative aspect of the invention, a technique for performing structural joins of two element sets of a tree-structured document, wherein one of the two element sets is an ancestor element set and the other of the two element sets is a descendant element set, and further wherein each element is represented as an interval representing a start position and an end position of the element in the document, comprises the following steps/operations. An index is dynamically built for the ancestor element set. Then, one or more structural joins are performed by searching the index with the interval start position of each element in the descendant element set.

Further, the step/operation of performing one or more structural joins may further comprise searching the index with the interval end position of each element in the descendant element set. The step/operation of dynamically building an index for the ancestor element set may further comprise building an interval index using both the start and end positions of each element in the ancestor element set.

Still further, the step/operation of dynamically building an index for the ancestor element set may further comprise partitioning an interval range among the elements in the ancestor set into one or more segments of a fixed size, defining a set of containment-encoded virtual intervals for each segment, decomposing each ancestor interval element into one or more containment-encoding virtual intervals, and associating an ancestor interval identifier with identifier lists associated with the decomposed virtual intervals.

The defining step/operation may further comprise defining a virtual interval which covers the segment and labeling the virtual interval with a first local identifier, partitioning the segment into two equal-length virtual intervals and respectively labeling the two equal-length virtual intervals from left to right with second and third local identifiers, partitioning the segment into four equal-length virtual intervals and respectively labeling the four equal-length virtual intervals from left to right with fourth, fifth, sixth and seventh local identifiers, and continuing the partitioning step until each virtual interval has a length of one. The defining step/operation may also comprise the containment-encoded virtual intervals (CEIs) for each segment having a local identifier (ID) and a global ID, and for a CEI with a local ID of m, the CEI containing two half-sized CEIs with local IDs of $2m$ and $2m+1$.

Also, the step/operation of searching of the interval index may further comprise finding the global ID of the CEI whose length is one and contains the start position of a descendant interval, finding the CEIs that contain the unit-length CEI, and combining the descendant interval ID with the interval IDs stored in the ID lists associated with the containing CEIs found in the finding steps/operations.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be understood that while the present invention may be described below in the context of an exemplary XML query processing application, the invention is not so limited. Rather, the invention is more generally applicable to any query processing application in which it would be desirable to perform efficient structural joins for answering containment queries.

As will be illustratively explained, the present invention provides a containment-encoded interval (CEI) indexing approach to efficient structural joins of two input interval lists. There is no requirement for sorting either of the input lists. Moreover, there is no need for pre-building of index for either of the input lists. In one embodiment, the entire interval range is partitioned into one or more segments of size $L=2^k$. A set of containment-encoded virtual intervals is predefined for each segment. These virtual intervals are labeled with proper identifiers (IDs) such that their IDs are encoded with containment relationships. Namely, from the IDs of two CEIs, their containment relationship can be easily deduced. Hence, the indexing scheme using CEIs is referred to as containment-encoded interval indexing. Note that these CEIs are virtual and remain virtual until they are used for the decomposition of queries. Then, they become activated.

Thus, in accordance with the invention, a CEI index for the ancestor list is constructed. There is no need for a CEI index for the descendant list. The CEI index is very simple and fast to construct. Hence, it can be built on-the-fly. With the containment-encoded virtual intervals, we indirectly and partially pre-compute the structural join results of the ancestor list with any of its potential descendant lists.

Further, in accordance with the invention, a structural join operation can be efficiently performed by simply using the start position, or the end position, of a descendant interval element to search the CEI index of the ancestor list. Then, the structural join operation combines the descendant interval ID with the proper interval IDs that contain that descendant interval, which are pre-computed and maintained in the ancestor CEI index. Because of the containment encoding, both the construction of the CEI index and the execution of the structural join are very fast. They involve only simple operations, such as additions, subtractions and logical shift operations. There is no need for complex floating-point multiplication or division operations. Hence, it is extremely efficient to perform structural joins using the containment-encoded interval indexing approach of the invention.

In the following description, it is assumed that each element in a tree-structured document, such as an XML document, is labeled with a region-encoded interval with a pair of numbers (start, end). They can be a pair of integers representing the absolute positions of the element in the document. In general, however, they can also be a pair of integer numbers representing the relative positions of the element in the document. An inverted list containing all the intervals of element occurrences in the document is assumed to be maintained for each element. Hence, structural joins can be performed for two different interval lists, one ancestor list and one descendant list. Techniques of the invention are used to perform structural joins between two element sets. Each element set is an interval list.

Figure 1:
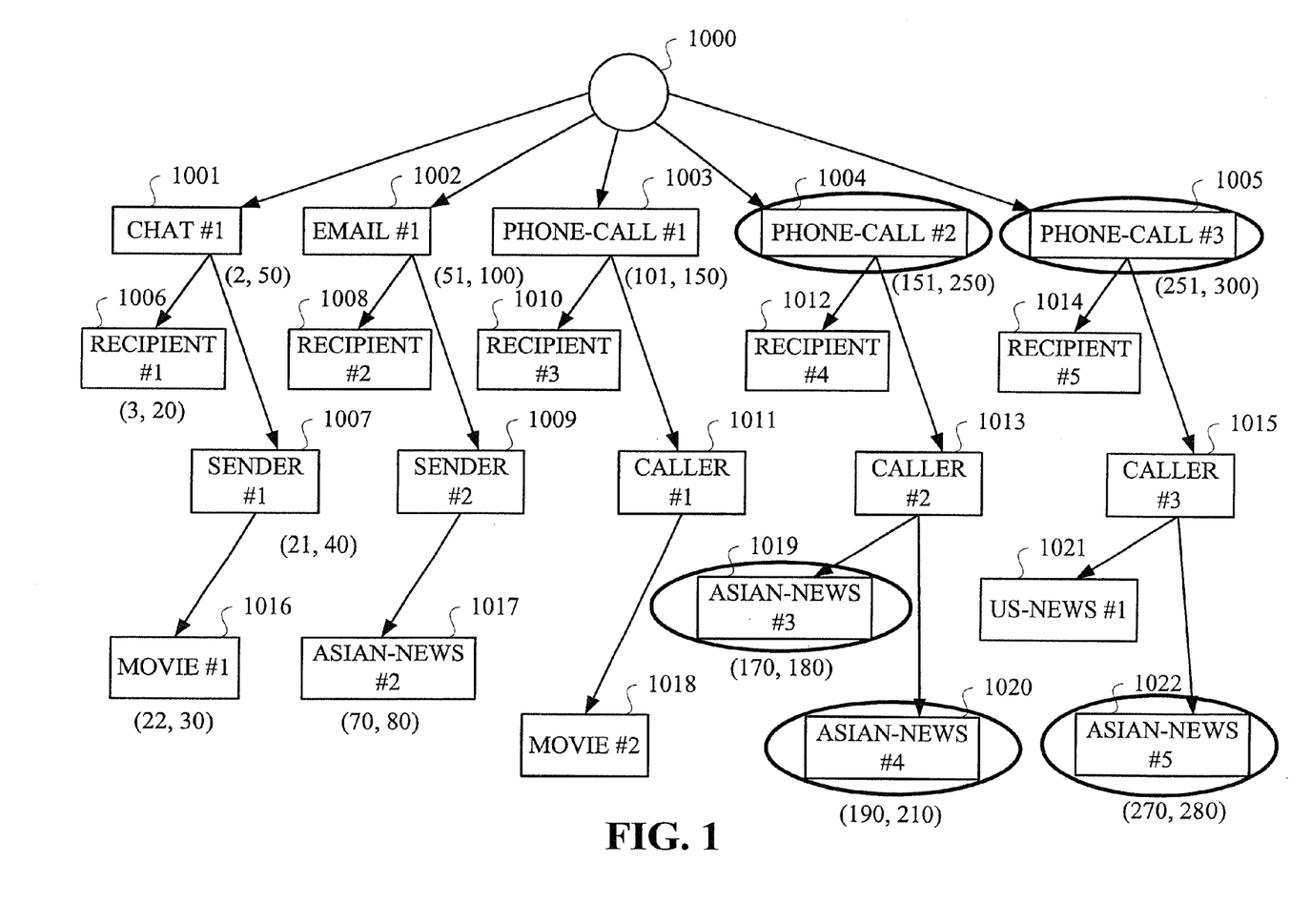
FIG. 1 is a diagram illustrating a document tree for use in explaining one or more embodiments of the present invention.

To further illustrate the problem of a structural join, FIG. 1 shows an example of a document tree 1000 that contains records of one chat (1001), one email (1002) and three phone-calls (1003, 1004, and 1005). Chat #1 (1001), labeled with an interval (2, 50), further contains recipient #1 (1006) which is labeled with an interval (3, 20), and sender #1 (1007) which is labeled with an interval (21, 40). Sender #1 (1007) contains movie #1 (1016), labeled with an interval (22, 30). Similarly, phone-call #2 (1004), labeled with an interval (151, 250), contains recipient #4 (1012) and sender #2 (1013). Sender #2 further contains Asian-News #3 (1019), which is labeled with an interval (170, 180), and Asian-News #4 (1020), labeled with an interval (190, 210). Other elements in document tree 1000 that are not specifically discussed in this example include recipient #2 (1008), sender #2 (1009), recipient #3 (1010), caller #1 (1011), recipient #5 (1014), caller #3 (1015), Asian0News #2 (1017), movie #$2 (1018), and US-News #1 (1021). Such elements are shown to illustrate a complete document tree example tree.

A structure query, or containment query, to find "//phone-call/Asian-News" from the document tree shown in FIG. 1 would yield the following result: "//phone-call #2//Asian-News #3", "//phone-call #2//Asian-News #4", and "//phone-call #3//Asian-News #5" (see those circled elements in FIG. 1: 1004, 1005, 1019, 1020, and 1022). Those skilled in the art will appreciate that Asian-News may appear under chat or email. Similarly, non Asian-News may also occur under phone-call.

Figure 2:
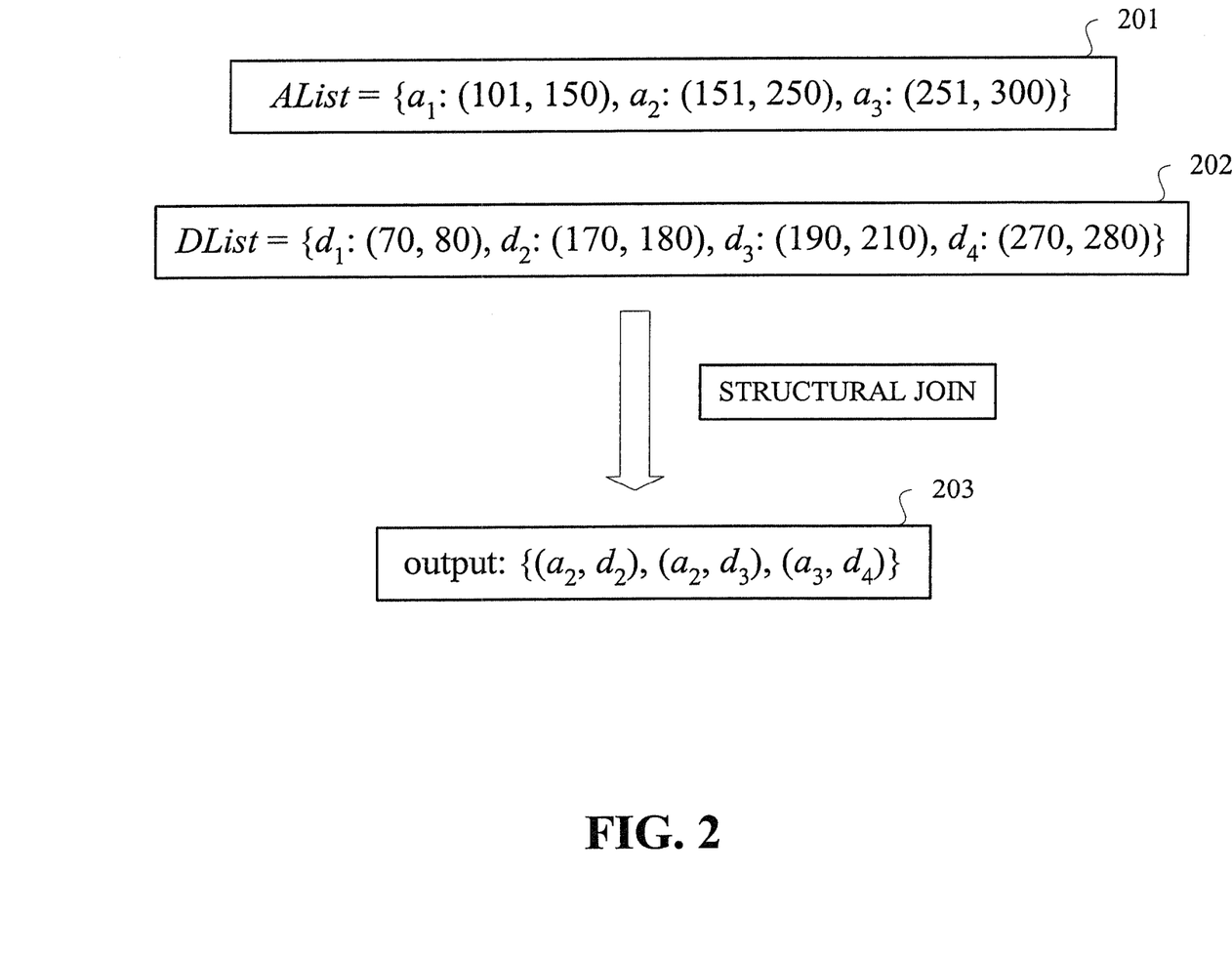
FIG. 2 is a diagram illustrating an ancestor element list and a descendant element list associated with the example of FIG. 1.

FIG. 2 shows the ancestor element list and descendant element list from FIG. 1. The ancestor list AList contains all occurrences of the phone-call element. AList, 201, has three intervals: $a_1$: (101,150), $a_2$: (151,250) and $a_3$: (251,300). The descendant list DList contains all occurrences of the Asian-News element. DList, 202, has four intervals: $d_1$: (70,80), $d_2$: (170,180), $d_3$: (190,210) and $d_4$: (270,280). The output result, 203, of a structural join of these two interval lists contains three pairs: ($a_2$,$d_2$), ($a_2$,$d_3$) and ($a_3$,$d_4$). This is because interval (151, 250) fully contains intervals (170, 180) and (190, 210); and interval (251, 300) fully contains interval (270, 280).

Figure 3:
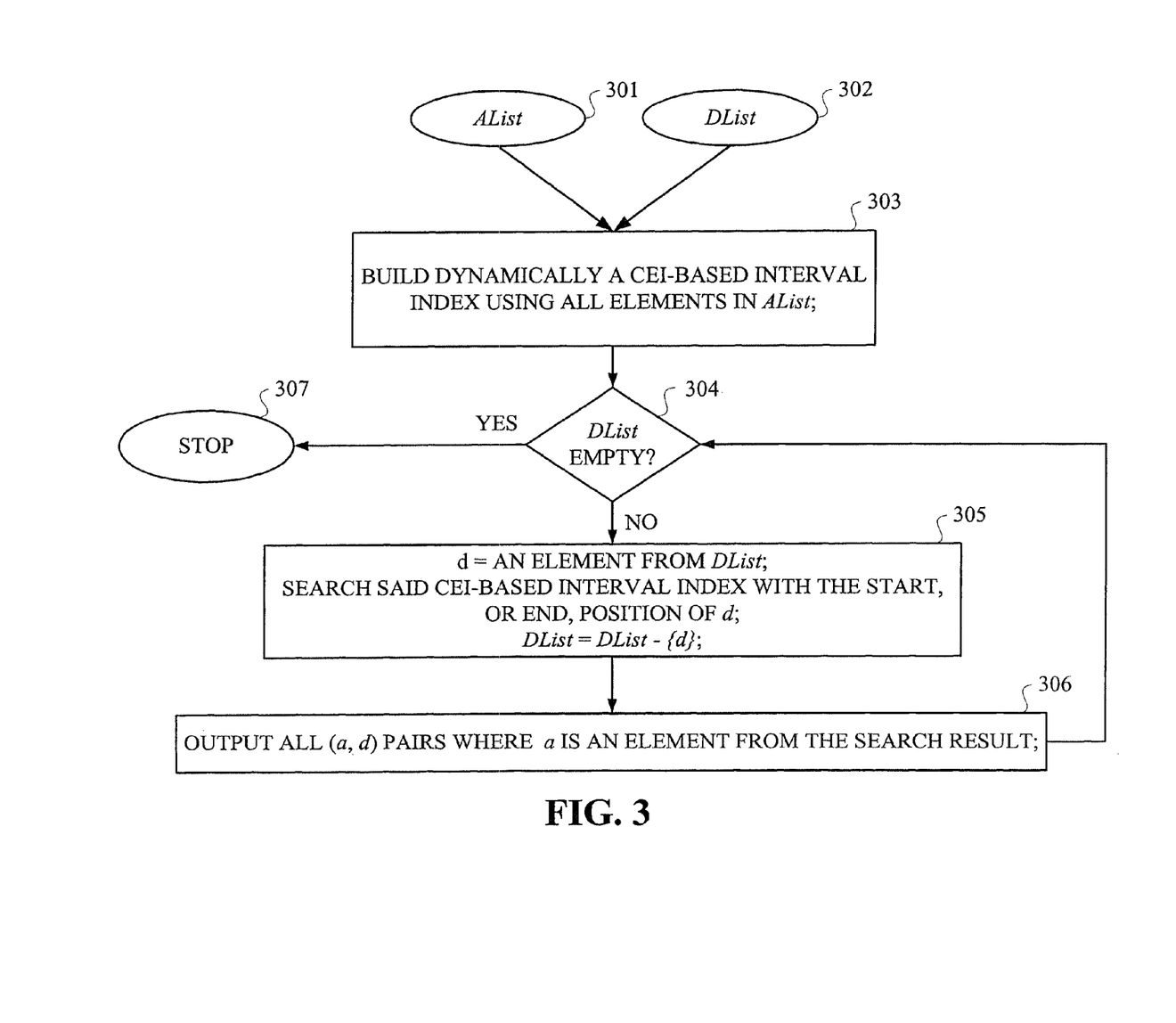
FIG. 3 is a diagram illustrating a methodology for performing a structural join operation on two interval lists, according to one embodiment of the present invention.

FIG. 3 shows a flow chart diagram of a process for performing a structural join operation on two interval lists, AList 301 and DList 302, in accordance with an embodiment of the present invention. The process first dynamically builds a CEI-based interval index using all elements in AList (step 303), which will be described in further detail below in the context of FIGS. 4 and 5. Then, the process loops through steps 304-306 until no element is left in DList. When DList is empty, the process stops, 307. Otherwise, in step 305, the process uses an element d from DList to search the CEI-based interval index built in step 303, and removes d from DList after the search. In step 306, the search result in step 305 is used to construct a pair of (a, d) as the join output. Note that here a is an element from the search result. The detail of the search algorithm will be described in further detail below in the context of FIG. 6.

The CEI-based interval index of an ancestor list is constructed as follows. Each interval element in the ancestor list is first decomposed into one or more containment-encoded virtual intervals. Then, the interval ID is inserted into the ID lists associated with the decomposed CEIs. First, let us define and label the CEIs.

Figure 4:
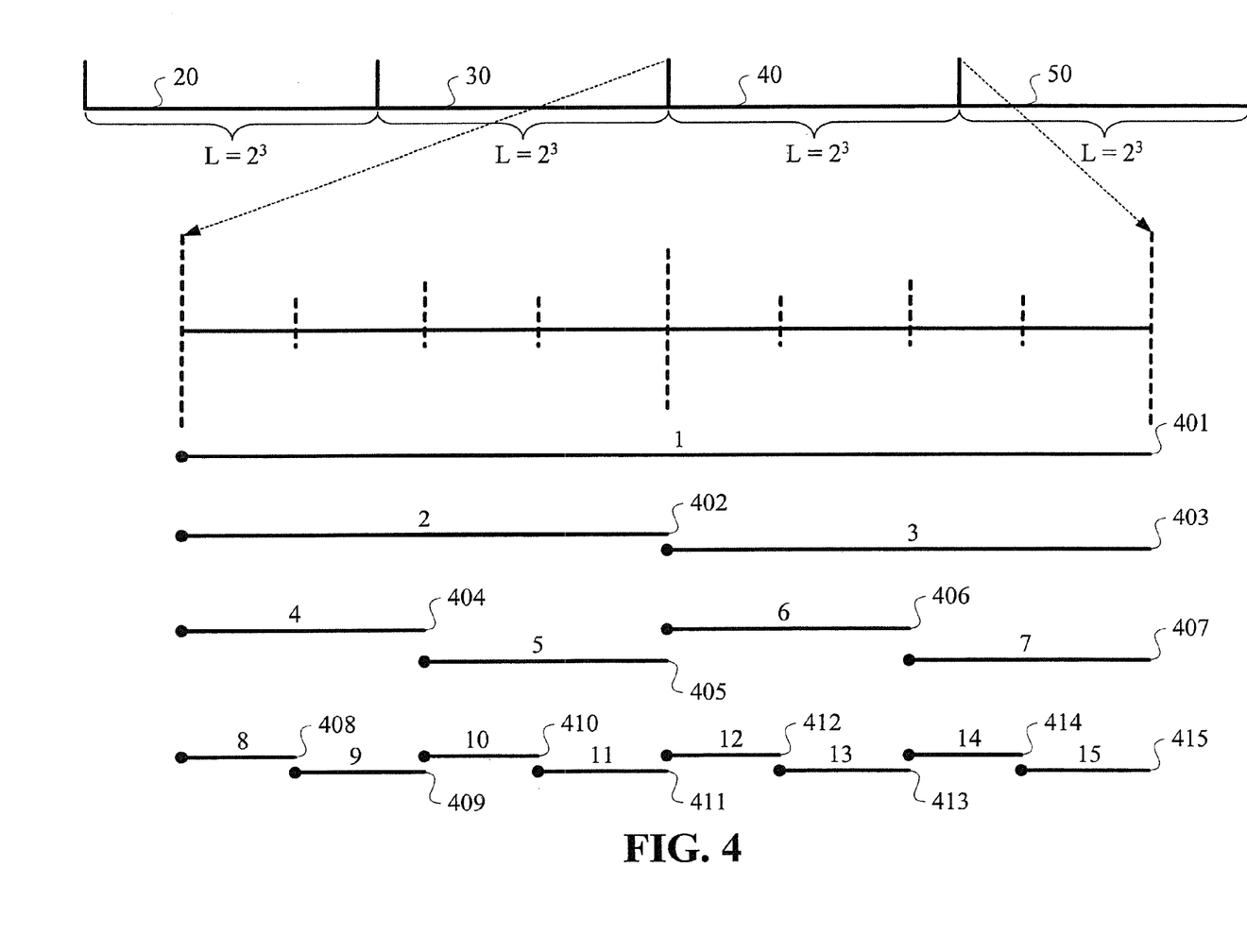
FIG. 4 is a diagram illustrating a definition of containment-encoded intervals, according to one embodiment of the present invention.

FIG. 4 shows a definition of containment-encoded intervals or CEIs, according to an embodiment of the present invention. Assume R is the range defined by the smallest start position and the largest end position among the intervals in the ancestor list. First, R is partitioned into one or more segments of length $L=2^k$, where k is an integer. FIG. 4 shows four such segments, 20, 30, 40 and 50, each of size eight. Within each segment, 2L−1 containment-encoded virtual intervals are defined (401-415). Virtual interval 1 (401) has length 8. Virtual intervals 2 and 3 (402 and 403) are defined by dividing virtual interval 1 (401) into two halves, with the left half as interval 2 (402) and the right half as interval 3 (403). Virtual intervals 4 and 5 (404 and 405) are similarly defied by further dividing virtual interval 2 (402) into two halves, with the left half as interval 4 (404) and the right half as interval 5 (405). This dividing process continues until intervals 8, 9, 10, 11, 12, 13, 14 and 15 (408-415) are similarly defined.

The naming of these virtual intervals within a segment is encoded with the containment relationship. Namely, virtual interval m contains virtual interval 2m and 2m+1, where m, 2m and 2m+1 are local IDs within the same segment. However, the global ID of a virtual interval is dependent on the segment ID. Namely, the unique global ID for virtual interval with a local ID of m within segment S is 2L*S+m.

Figure 5:
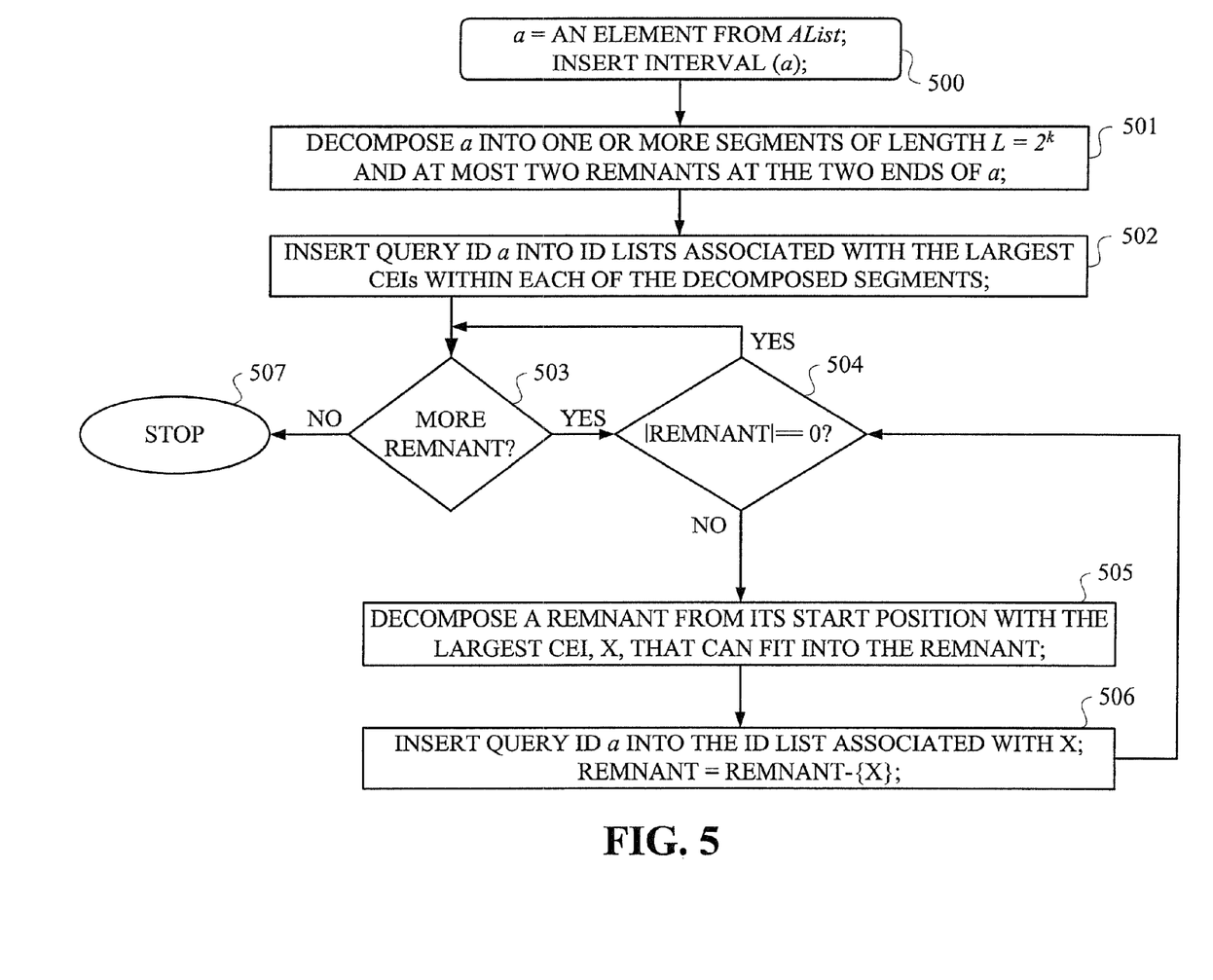
FIG. 5 is a diagram illustrating a methodology for building an interval query index, according to one embodiment of the present invention.

FIG. 5 shows a flow chart diagram of a methodology for building a CEI-based interval index by inserting an interval a from AList (500). Each interval is first decomposed into one or more containment-encoded virtual intervals. Then, the query ID is inserted into the ID lists associated with the decomposed CEIs. Because the length of a can be larger or smaller than the segment size L, interval a is first decomposed into one or more segments of length L and at most two remnants with length less than L (step 501). The remnants must be at the two ends of a. However, if the length of a is less than L, then the entire query interval is treated as a remnant and it is inside a segment. Query ID a is then inserted into the ID lists associated with the largest CEIs within each of the decomposed segment (step 502). Note that the largest CEI within a segment has the local ID 1 and it has length L.

After that, the remnants are decomposed into one or more CEIs and the query ID a is inserted into the ID lists associated with these decomposed CEIs (steps 503-506). If no more remnants are left, the insertion algorithm stops (507). For each remnant, the decomposition ends when its length is zero (step 504). The decomposition begins from the starting position of the remnant and finds the largest CEI, X, that can fit into the remnant (step 505). Then, the query ID a is inserted into the ID list associated with X. After that, X is removed from the remnant (step 506). The decomposition process continues at step 504 to test if the length of the resulting remnant is zero. If not, it repeats steps 505 and 506.

It is to be appreciated that the insertion algorithm described in FIG. 5 tries to use a minimal number of CEIs in the decomposition of an interval query. There can be more than one possible process for performing decomposition. However, because the query ID is inserted into the ID lists associated with each decomposed CEIs, the index storage cost can be minimized if a minimal number of CEIs are used in the decomposition. Hence, it is preferable to decompose an interval into a minimal number of CEIs.

Figure 6:
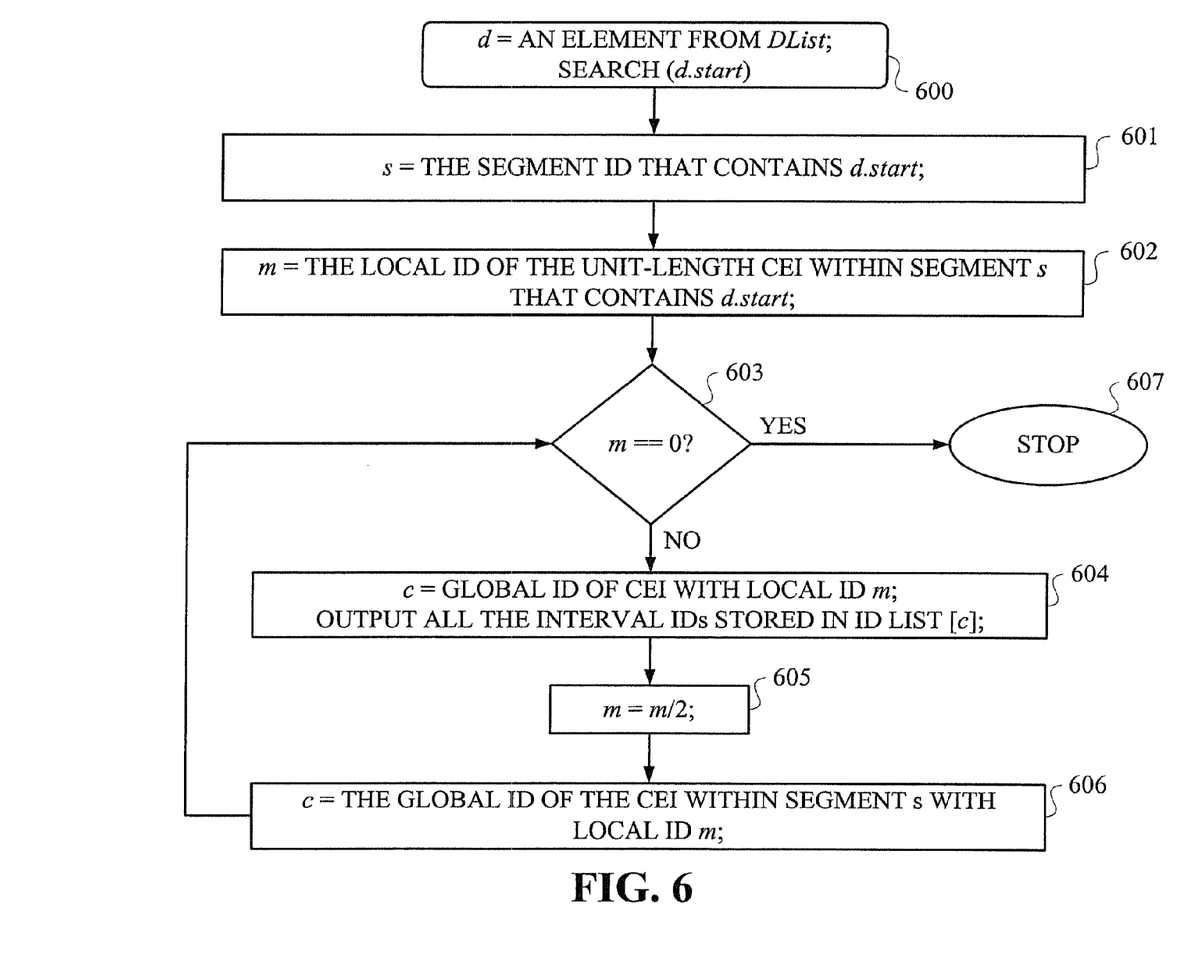
FIG. 6 is a diagram illustrating a methodology for searching an interval query index, according to one embodiment of the present invention.

FIG. 6 shows an algorithm for searching the interval query index built with the methodology described above in the context of FIG. 5. The input parameter for search is the start position d.start of each descendant element in DList. Alternatively, the input parameter can be the end position of each descendant element in DList. The search operation starts by computing the segment ID s that contains the start value d.start of element d (step 601). This can be easily done by using the formula, $s = \lfloor d.start/L \rfloor$, where $\lfloor y \rfloor$ is a floor operator which returns the largest integer number that is smaller or equal to y.

After the segment ID is computed, the local ID m of the unit-length CEI can be computed (step 602). This can be done via the following formula, $m = d.start - sL + L$. With the local ID of the unit-length CEI available, the process can easily identify all the other CEIs that can possibly contain data value d.start (steps 603-607). In step 603, the process checks if m is 0. If yes, then the search process stops (607). If not, then the process computes the global ID c of CEI with local ID m, and outputs all the interval IDs stored in the ID list associated with CEI c (step 604). Then, the process computes a new m by an integer division of m by two (step 605). With a new m, the process computes the corresponding new c and outputs the IDs stored in the ID list associated with CEI c (step 606). After that the process repeats, beginning at step 603.

Figure 7:
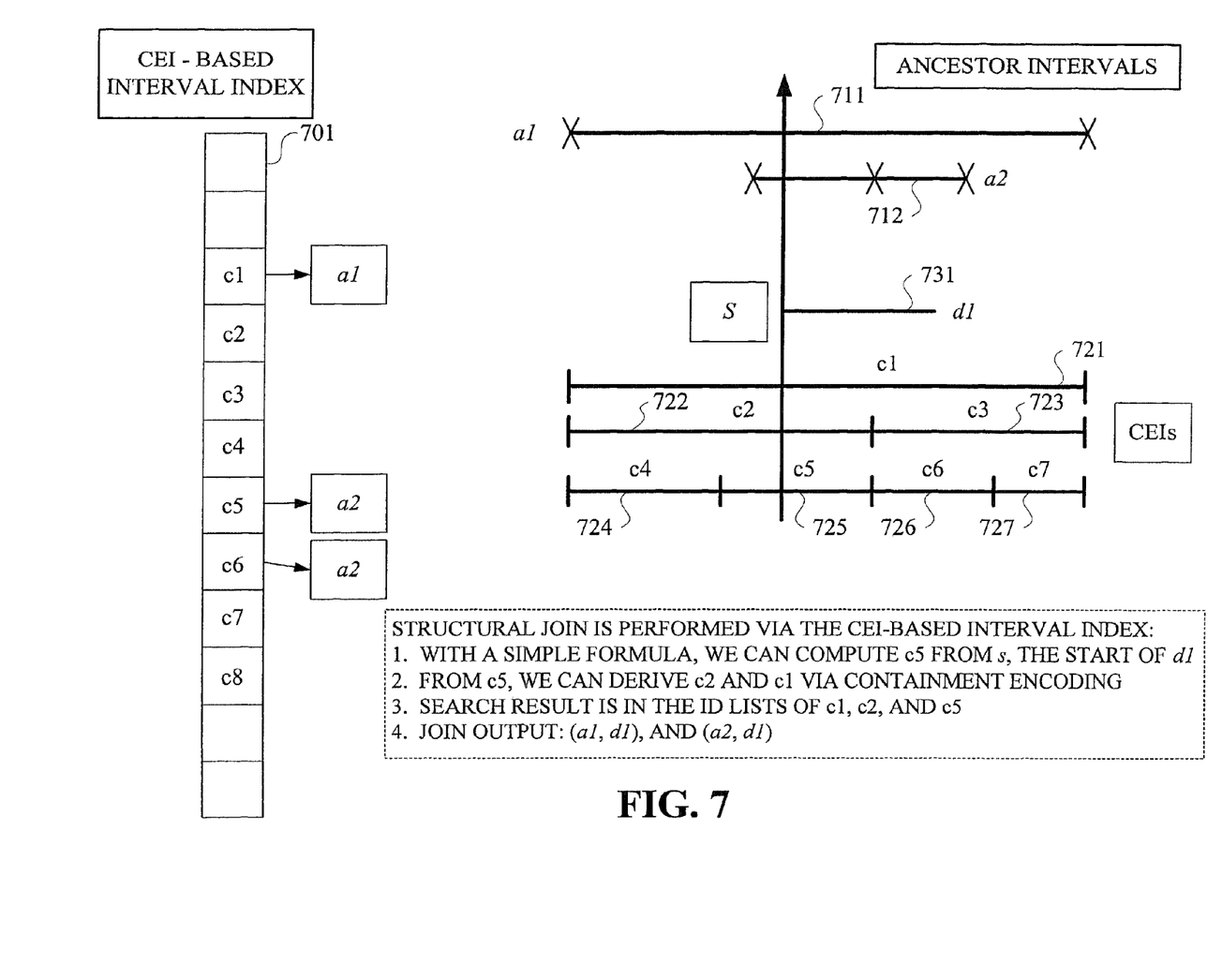
FIG. 7 is a diagram illustrating insertion of two intervals from an ancestor element list into a containment-encoded interval index, according to an embodiment of the invention.

FIG. 7 shows an example of inserting two intervals, a1 (711) and a2 (712), from AList into a CEI-based interval index and uses an element d1 (731) from DList to perform a structural join operation. The CEI-based interval index (701) is an array of interval ID lists. Each CEI has its own associated ID list. The ID list associated with CEI c stores all interval IDs that use c in the decomposition. A set of seven CEIs (721-727) are predefined and used to decompose two intervals, a1 and a2, from AList. Interval a1 is decomposed into CEI c1. Hence, a1 is inserted into the ID list associated with c1. Interval a2 is decomposed into CEIs c5 and c6. Hence, a2 is inserted into the ID lists associated with c5 and c6.

For computing a structural join, the start position of an interval d1 from DList is used to search the CEI-based interval index. With a simple formula, the unit-length CEI that contains the start position of d1 can be computed. For example, assuming s is the start position of d1, the local ID of the unit-length CEI that contains s can be computed as $(s - \lfloor s/L \rfloor \times L + L)$, where L is the segment length. From FIG. 7, this unit-length CEI is c5. From c5, all other CEIs that can possibly contain c5 can be derived easily via containment encoding. These CEIs are c2 and c1. Hence, the join output includes (a1, d1) and (a2, d1).

Figure 8A:
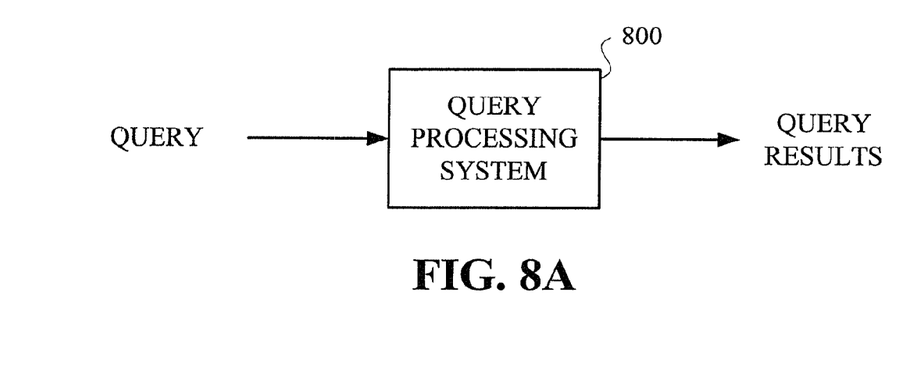
FIG. 8A is a diagram illustrating a query processing system, according to one embodiment of the present invention.

FIG. 8A shows a system block diagram of query processing system 800 that employs a containment-encoded query index and performs structural join operations, according to an embodiment of the present invention. It is to be appreciated that, in general, query processing system 800 receives a query and, using one or more of the methodologies described herein (e.g., in the context of FIGS. 3-7), generates a query result.

Figure 8B:
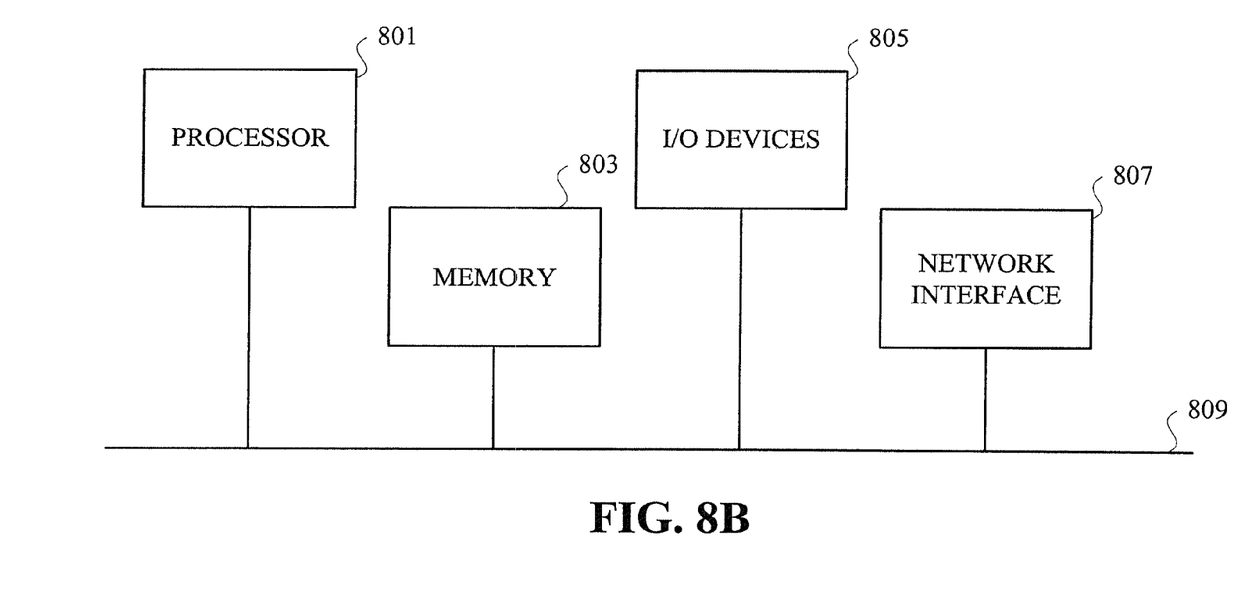
FIG. 8B is a diagram illustrating a computer system suitable for implementing a query processing system, according to one embodiment of the present invention.

FIG. 8B illustrates an exemplary computing system environment for implementing a query processing system according to an embodiment of the present invention. More particularly, the query processing system illustrated in FIG. 8A may implement such a computing system as shown in FIG. 8B to perform the techniques of the invention (e.g., as described above in the context of FIGS. 3-7). For example, a server implementing the query processing principles of the invention may implement such a computing system. Of course, it is to be understood that the invention is not limited to any particular computing system implementation.

In this illustrative implementation, a processor 801 for implementing at least a portion of the methodologies of the invention is operatively coupled to a memory 803, input/output (I/O) devices 805 and a network interface 807 via a bus 809, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit.

Still further, the phrase "network interface" as used herein is intended to include, for example, one or more devices capable of allowing the computing system 600 to communicate with other computing systems. Thus, the network interface may include a transceiver configured to communicate with a transceiver of another computing system via a suitable communications protocol, over a suitable network, e.g., the Internet, private network, etc. It is to be understood that the invention is not limited to any particular communications protocol or network.

It is to be appreciated that while the present invention has been described herein in the context of a data processing system, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital and analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 801.

In any case, it is to be appreciated that the techniques of the invention, described herein and shown in the appended figures, may be implemented in various forms of hardware, software, or combinations thereof, e.g., one or more operatively programmed general purpose digital computers with associated memory, application-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method for performing structural joins of two element sets of a tree-structured document, wherein one of the two element sets is an ancestor element set and the other of the two element sets is a descendant element set, and further wherein each element is represented as an interval representing a start position and an end position of the element in the document, comprising the steps of:
   dynamically building an index for the ancestor element set; and
   performing one or more structural joins by searching the index with the interval start position of each element in the descendant element set;
   wherein results of the performance of the one or more structural joins are useable to process a query of the tree-structured document;
   wherein the step of dynamically building an index for the ancestor element set further comprises the steps of:
      partitioning an interval range among the elements in the ancestor set into one or more segments of a fixed size; and
      defining a set of containment-encoded virtual intervals for each segment; and
   wherein the step of defining a set of virtual intervals for each of the one or more segments further comprises the steps of:
      defining a virtual interval which covers the segment and labeling the virtual interval with a first local identifier;
      partitioning the segment into two equal-length virtual intervals and respectively labeling the two equal-length virtual intervals from left to right with second and third local identifiers;
      partitioning the segment into four equal-length virtual intervals and respectively labeling the four equal-length virtual intervals from left to right with fourth, fifth, sixth and seventh local identifiers; and
      continuing the partitioning step until each virtual interval has a length of one.

2. The method of claim 1, wherein the step of performing one or more structural joins further comprises the step of searching the index with the interval end position of each element in the descendant element set.

3. The method of claim 1, wherein the step of dynamically building an index for the ancestor element set further comprises the step of building an interval index using both the start and end positions of each element in the ancestor element set.

4. The method of claim 1, wherein the step of dynamically building an index for the ancestor element set further comprises the steps of:
   decomposing each ancestor interval element into one or more containment-encoding virtual intervals; and
   associating an ancestor interval identifier with identifier lists associated with the decomposed virtual intervals.

5. Apparatus for performing structural joins of two element sets of a tree-structured document, wherein one of the two element sets is an ancestor element set and the other of the two element sets is a descendant element set, and further wherein each element is represented as an interval representing a start position and an end position of the element in the document, comprising:
   a memory; and
   at least one processor coupled to the memory and operative to: (i) dynamically build an index for the ancestor element set; and (ii) perform one or more structural joins by searching the index with the interval start position of each element in the descendant element set;
   wherein results of the performance of the one or more structural joins are useable to process a query of the tree-structured document; and
   wherein the operation of dynamically building an index for the ancestor element set further comprises:
      partitioning an interval range among the elements in the ancestor set into one or more segments of a fixed size; and
      defining a set of containment-encoded virtual intervals for each segment; and
   wherein the operation of defining a set of virtual intervals for each of the one or more segments further comprises:
      defining a virtual interval which covers the segment and labeling the virtual interval with a first local identifier;
      partitioning the segment into two equal-length virtual intervals and respectively labeling the two equal-length virtual intervals from left to right with second and third local identifiers;
      partitioning the segment into four equal-length virtual intervals and respectively labeling the four equal-length virtual intervals from left to right with fourth, fifth, sixth and seventh local identifiers; and
      continuing the partitioning step until each virtual interval has a length of one.

6. The apparatus of claim 5, wherein the operation of performing one or more structural joins further comprises searching the index with the interval end position of each element in the descendant element set.

7. The apparatus of claim 5, wherein the operation of dynamically building an index for the ancestor element set further comprises building an interval index using both the start and end positions of each element in the ancestor element set.

8. The apparatus of claim 5, wherein the operation of dynamically building an index for the ancestor element set further comprises:
   decomposing each ancestor interval element into one or more containment-encoding virtual intervals; and
   associating an ancestor interval identifier with identifier lists associated with the decomposed virtual intervals.

9. Apparatus for performing structural joins of two element sets of a tree-structured document, wherein one of the two element sets is an ancestor element set and the other of the two element sets is a descendant element set, and further wherein each element is represented as an interval representing a start position and an end position of the element in the document, comprising:
- a memory; and
- at least one processor coupled to the memory and operative to: (i) dynamically build an index for the ancestor element set; and (ii) perform one or more structural joins by searching the index with the interval start position of each element in the descendant element set;
- wherein results of the performance of the one or more structural joins are useable to process a query of the tree-structured document; and
- wherein the operation of dynamically building an index for the ancestor element set further comprises:
  - partitioning an interval range among the elements in the ancestor set into one or more segments of a fixed size; and
  - defining a set of containment-encoded virtual intervals for each segment; and
- wherein the defining operation further comprises the containment-encoded virtual intervals (CEIs) for each segment having a local identifier (ID) and a global ID, and for a CEI with a local ID of in, the CEI containing two half-sized CEIs with local IDs of $2m$ and $2m+1$.

10. The apparatus of claim 9, wherein the operation of searching of the interval index further comprises:
- finding the global ID of the CEI whose length is one and contains the start position of a descendant interval;
- finding the CEIs that contain the unit-length CEI; and
- combining the descendant interval ID with the interval IDs stored in the ID lists associated with the containing CEIs found in the finding operations.

11. An article of manufacture for performing structural joins of two element sets of a tree-structured document, wherein one of the two element sets is an ancestor element set and the other of the two element sets is a descendant element set, and further wherein each element is represented as an interval representing a start position and an end position of the element in the document, comprising a tangible machine readable medium containing one or more programs which when executed implement the steps of:
- dynamically building an index for the ancestor element set; and
- performing one or more structural joins by searching the index with the interval start position of each element in the descendant element set;
- wherein results of the performance of the one or more structural joins are useable to process a query of the tree-structured document;
- wherein the step of dynamically building an index for the ancestor element set further comprises:
  - partitioning an interval range among the elements in the ancestor set into one or more segments of a fixed size; and
  - defining a set of containment-encoded virtual intervals for each segment; and
- wherein the step of defining a set of virtual intervals for each of the one or more segments further comprises:
  - defining a virtual interval which covers the segment and labeling the virtual interval with a first local identifier;
  - partitioning the segment into two equal-length virtual intervals and respectively labeling the two equal-length virtual intervals from left to right with second and third local identifiers;
  - partitioning the segment into four equal-length virtual intervals and respectively labeling the four equal-length virtual intervals from left to right with fourth, fifth, sixth and seventh local identifiers; and
  - continuing the partitioning step until each virtual interval has a length of one.

12. The article of claim 11, wherein the step of performing one or more structural joins further comprises searching the index with the interval end position of each element in the descendant element set.

13. The article of claim 11, wherein the step of dynamically building an index for the ancestor element set further comprises building an interval index using both the start and end positions of each element in the ancestor element set.

14. The article of claim 11, wherein the step of dynamically building an index for the ancestor element set further comprises:
- decomposing each ancestor interval element into one or more containment-encoding virtual intervals; and
- associating an ancestor interval identifier with identifier lists associated with the decomposed virtual intervals.

15. An article of manufacture for performing structural joins of two element sets of a tree-structured document, wherein one of the two element sets is an ancestor element set and the other of the two element sets is a descendant element set, and further wherein each element is represented as an interval representing a start position and an end position of the element in the document, comprising a tangible machine readable medium containing one or more programs which when executed implement the steps of:
- dynamically building an index for the ancestor element set; and
- performing one or more structural joins by searching the index with the interval start position of each element in the descendant element set;
- wherein results of the performance of the one or more structural joins are useable to process a query of the tree-structured document;
- wherein the step of dynamically building an index for the ancestor element set further comprises:
  - partitioning an interval range among the elements in the ancestor set into one or more segments of a fixed size; and
  - defining a set of containment-encoded virtual intervals for each segment; and
- wherein the defining step further comprises the containment-encoded virtual intervals (CEIs) for each segment having a local identifier (ID) and a global ID, and for a CEI with a local ID of m, the CEI containing two half-sized CEIs with local IDs of $2m$ and $2m+1$.

16. The article of claim 15, wherein the step of searching of the interval index further comprises:
- finding the global ID of the CEI whose length is one and contains the start position of a descendant interval;
- finding the CEIs that contain the unit-length CEI; and
- combining the descendant interval ID with the interval IDs stored in the ID lists associated with the containing CEIs found in the finding operations.

* * * * *